US012687062B2

(12) United States Patent
Shin et al.

(10) Patent No.: US 12,687,062 B2
(45) Date of Patent: Jul. 21, 2026

(54) AUTOMATIC CONTROL OF VEHICLE ACCESS DOOR

(71) Applicant: GM GLOBAL TECHNOLOGY OPERATIONS LLC, Detroit, MI (US)

(72) Inventors: Hyundong Shin, Seoul (KR); Hyoungsuk Kim, Incheon (KR); Rakyung Gwak, Incheon (KR); Bongbum Back, Incheon (KR); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 23 days.

(21) Appl. No.: 18/804,317

(22) Filed: Aug. 14, 2024

(65) Prior Publication Data

US 2026/0049515 A1 Feb. 19, 2026

(51) Int. Cl.
*E05F 15/00* (2015.01)
*E05F 15/43* (2015.01)

(52) U.S. Cl.
CPC ........ *E05F 15/43* (2015.01); *E05F 2015/434* (2015.01); *E05Y 2900/546* (2013.01)

(58) Field of Classification Search
CPC ................ E05F 15/43; E05F 2015/434; E05Y 2900/546
See application file for complete search history.

(56) References Cited

U.S. PATENT DOCUMENTS

| | | | | |
|---|---|---|---|---|
| 7,219,945 | B1 * | 5/2007 | Zinn | B60J 5/101 49/26 |
| 2003/0071727 | A1 * | 4/2003 | Haag | E05F 15/46 324/674 |
| 2004/0095250 | A1 * | 5/2004 | Chapman | G01V 8/20 318/471 |
| 2010/0228448 | A1 * | 9/2010 | Nakakura | E05F 15/43 701/49 |

(Continued)

FOREIGN PATENT DOCUMENTS

| | | |
|---|---|---|
| DE | 102010009889 A1 | 9/2011 |
| DE | 102017128294 A1 | 6/2018 |

(Continued)

*Primary Examiner* — Peter D Nolan
*Assistant Examiner* — Peter Y Ning
(74) *Attorney, Agent, or Firm* — Quinn IP Law

(57) ABSTRACT

A method of operating an access door in a vehicle includes receiving, via an electronic controller, a command to open the access door and detecting an obstacle within range of operation of the access door. The method also includes generating, via a camera, a predefined image on the obstacle relative to the access door and processing, via the electronic controller, a pixelated resolution of the generated image. The method additionally includes determining, via the electronic controller, a distance of the obstacle from the access door and relative to the door's range of operation using the pixelated resolution of the image. Furthermore, the method includes limiting, via the electronic controller, the access door's range of operation when the distance of the obstacle from the door and relative to the door's range of operation (Continued)

is within a predetermined zone to avoid physical contact between the access door and the obstacle.

20 Claims, 3 Drawing Sheets

(56) References Cited

U.S. PATENT DOCUMENTS

| | | | | |
|---|---|---|---|---|
| 2014/0207344 | A1* | 7/2014 | Ihlenburg | E05F 15/73<br>701/49 |
| 2017/0306684 | A1* | 10/2017 | Baruco | E05F 15/43 |
| 2018/0238099 | A1* | 8/2018 | Schatz | E05F 15/40 |
| 2019/0309564 | A1* | 10/2019 | Mitchell | B60Q 5/005 |
| 2020/0018111 | A1* | 1/2020 | Akbarian | E05F 15/40 |
| 2020/0088839 | A1* | 3/2020 | Miu | G01S 7/023 |
| 2020/0157873 | A1* | 5/2020 | Sabatini | E05B 81/76 |
| 2020/0392779 | A1* | 12/2020 | Zhu | B60J 5/105 |
| 2021/0262274 | A1* | 8/2021 | Schatz | G01S 13/931 |
| 2023/0055978 | A1* | 2/2023 | Cai | B60W 30/09 |
| 2023/0089000 | A1* | 3/2023 | Peterson | B60R 25/2045<br>343/711 |
| 2024/0059325 | A1* | 2/2024 | Rubin | B60W 60/0027 |
| 2025/0305339 | A1* | 10/2025 | Herman | E05F 15/42 |

FOREIGN PATENT DOCUMENTS

| | | | | |
|---|---|---|---|---|
| DE | 102018101613 A1 | | 8/2018 | |
| DE | 102023128654 A1 | | 10/2024 | |
| WO | WO-2013075242 A1 | * | 5/2013 | G01D 5/24 |

* cited by examiner

AUTOMATIC CONTROL OF VEHICLE ACCESS DOOR

The present disclosure is drawn to automatic control of a vehicle access door using the vehicle's camera.

A typical vehicle has at least one door to provide vehicle user access to the vehicle's interior. Generally, such access doors are either hinged to swing-out relative to the vehicle body or are configured to slide relative thereto. An access door typically has a latch mechanism for maintaining the door in a closed state until access into or egress from the vehicle is required. The door latch mechanism is generally actuated by an outside door handle to gain access to the interior of the vehicle and by an interior door handle to permit the occupant to exit the vehicle interior.

Vehicles frequently have enclosed cargo areas positioned either at the front or at the rear end of the vehicle body. The design of such cargo enclosures typically includes a hinged cargo door, such as a deck-lid or a tailgate for security and convenient access. Generally, similar to vehicle side doors, cargo enclosure doors employ latch mechanisms for maintaining the enclosure in a closed state until access thereto is required. In modern vehicles, latch mechanisms for both the side doors and cargo doors are frequently power actuated. Additionally, some vehicles offer remote door actuation systems employing various sensors and transmitters to detect a user's intention to access or secure the vehicle.

SUMMARY

A method of operating an access door in a vehicle includes receiving, via an electronic controller, a command to open the access door and detecting an obstacle within range of operation of the access door. The method also includes generating, via a camera, a predefined image on the obstacle relative to the access door and processing, via the electronic controller, a pixelated resolution of the generated image. The method additionally includes determining, via the electronic controller, a distance of the obstacle from the access door and relative to the access door's range of operation using the pixelated resolution of the generated image. Furthermore, the method includes limiting, via the electronic controller, the access door's range of operation when the distance of the obstacle from the door and relative to the door's range of operation is within a predetermined zone to avoid physical contact between the access door and the obstacle.

The method may include generating, via the electronic controller, a sensory signal or alert when the distance of the obstacle from the access door and relative to the access door's range of operation is within the predetermined zone.

The vehicle may have a vehicle body defined by body-sides, a front end, and a rear end, and the access door may be a liftgate arranged at the rear end of the vehicle.

Detecting the obstacle may be accomplished via the camera.

Generating the predefined image on the obstacle may include projecting a light onto the obstacle via a light source mounted to the vehicle adjacent to the camera, such that the image generated on the obstacle is within the projected light.

Determining the distance of the obstacle from the access door and relative to the access door's range of operation may be accomplished via a machine learning algorithm programmed into the electronic controller.

The method may also include determining a global position of the detected obstacle and communicating or sharing, via the electronic controller, the determined global position of the obstacle to an information technology (IT) cloud server arranged remotely from the vehicle and in wireless communication with the electronic controller.

The method may additionally include retaining or storing the communicated determined global position of the detected obstacle on the IT cloud server to generate an obstacle database.

The method may also include communicating or sharing from the obstacle database, via the IT cloud server, the determined global position of the detected obstacle with another electronic controller (e.g., positioned on another vehicle).

The method may additionally include monitoring, via the camera, an area surrounding the vehicle for changed obstruction conditions (e.g., another parked vehicle parked within the predetermined zone).

The method may further include operating the vehicle, via the electronic controller, in autonomous mode to shift the vehicle outside the predetermined zone and thereby achieve operating clearance for the access door relative to the detected obstacle.

A system for operating an access door in a vehicle having the electronic controller and the camera is also disclosed.

The above features and advantages, and other features and advantages of the present disclosure, will be readily apparent from the following detailed description of the embodiment (s) and best mode(s) for carrying out the described disclosure when taken in connection with the accompanying drawings and appended claims.

DETAILED DESCRIPTION

Figure 1:
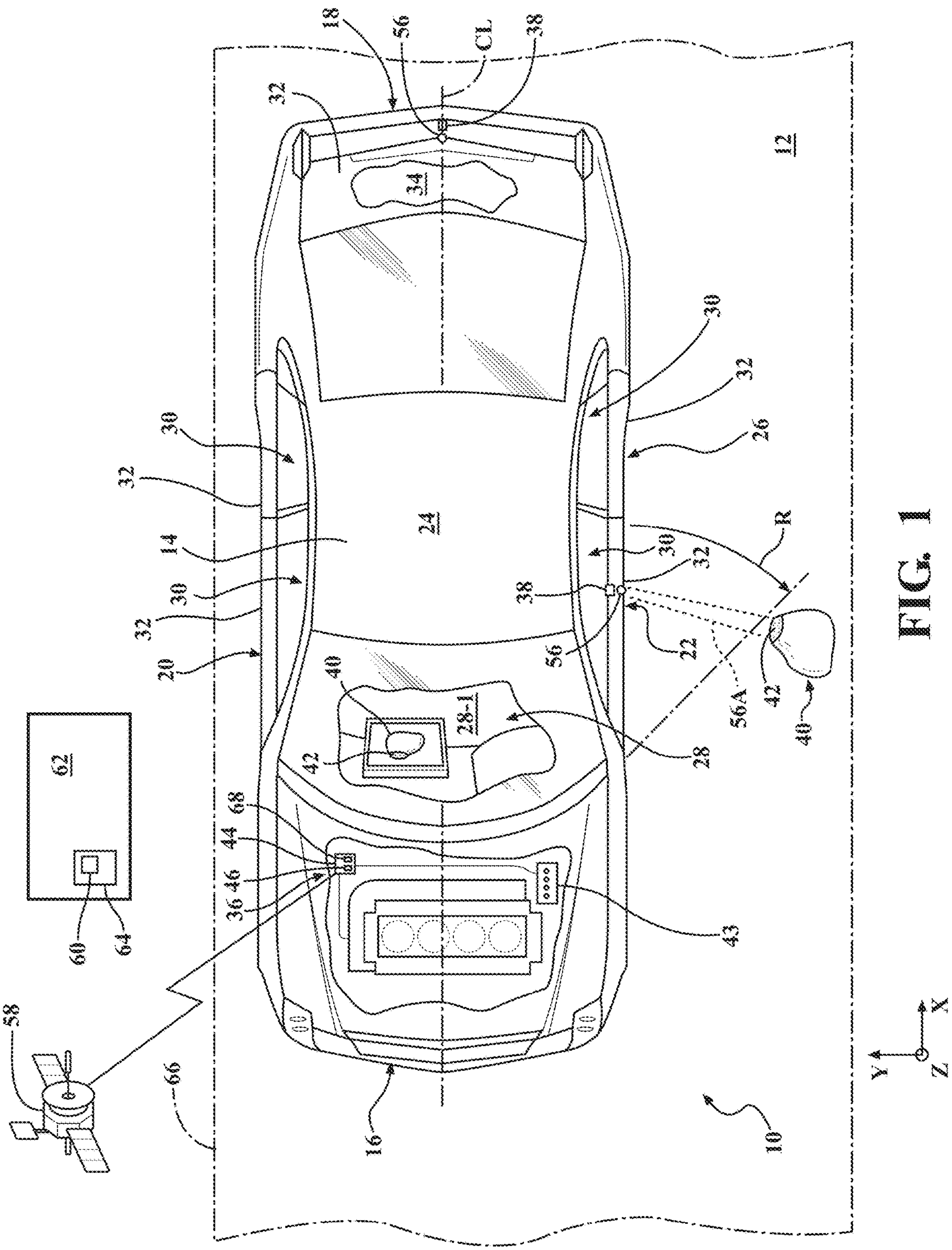
FIG. 1 is a schematic top view of a vehicle having a passenger compartment and a cargo enclosure with respective access doors and having a system for automatic operation of subject access doors relative to an obstacle, according to the disclosure.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made. Terms such as "front", "back", "fore", "aft", "left", "right", "rear", "side", "upward", "downward", "top", and "bottom", etc., describe the orientation and/or location of portions of the components or elements within a consistent but arbitrary frame of reference, which is made clear by reference to the text and the associated drawings describing the components or elements under discussion.

Furthermore, terms such as "first", "second", "third", and so on may be used to describe separate components. Such terminology may include the words specifically mentioned above, derivatives thereof, and words of similar import, and are used descriptively for the figures, and do not represent limitations on the scope of the disclosure, as defined by the appended claims. Moreover, the teachings may be described herein in terms of functional and/or logical block components and/or various processing steps. It should be realized that such block components may include a number of hardware, software, and/or firmware components configured to perform the specified functions.

Referring to the drawings, wherein like reference numbers refer to like components, FIG. 1 shows a schematic view of a motor vehicle 10 positioned relative to a road surface 12 in an X-Y plane. The vehicle 10 includes a vehicle body 14. As shown, the vehicle body 14 is arranged relative to a longitudinal centerline CL. The vehicle body 14 generally defines six body sides. The six body sides include a first body end or front end 16, an opposing second body end or rear end 18, a first lateral body side or left side 20, a second lateral body side or right side 22, a top body portion 24, which may include a vehicle roof, and an underbody portion (not shown) generally facing the road surface 12. The left side 20 and right side 22 are disposed generally parallel to each other and with respect to the longitudinal centerline CL of the vehicle body 14 and span the distance between the front end 16 and the rear end 18.

The body sides 16, 18, 20, 22, 24, together with the underbody portion define a vehicle exterior 26. The body 14 also defines a vehicle interior 28 that includes a passenger compartment 28-1. The passenger compartment 28-1 is adapted to accommodate vehicle passengers and their belongings. As shown in FIG. 1, the vehicle 10 also includes at least one access opening 30 that is defined by the body 14 and provides access to the vehicle interior 28. As shown, the vehicle body 14 defines five individual access openings 30. The vehicle 10 also includes a number of access doors 32, one door for each of the access openings 30. Each of the side access doors may be pivotable outward relative to the vehicle body 14. Accordingly, each access door 32 is configured to selectively cover and uncover at least a portion of the respective access opening 30 to control passage between the vehicle exterior 26 and the vehicle interior 28. As shown, four of the access openings are side entries configured to provide access to the passenger compartment 28-1, while the fifth opening provides access into a cargo enclosure 34.

Figure 2:
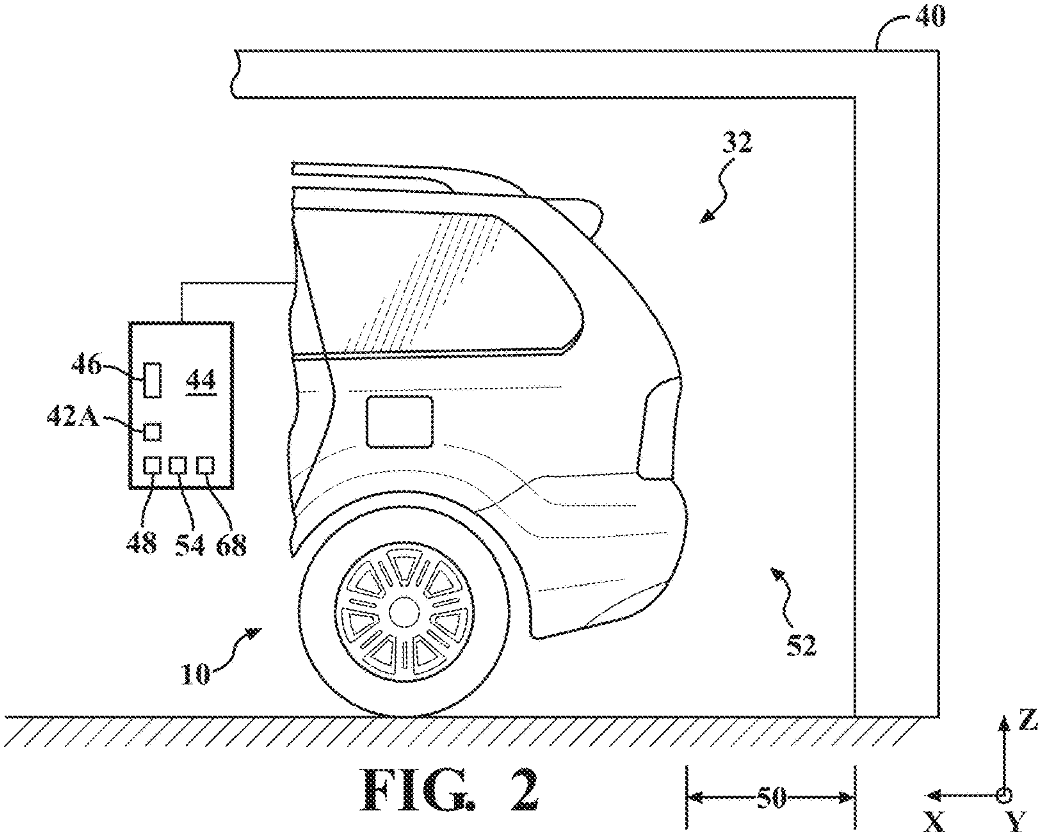
FIG. 2 is a partial side view of the vehicle having the system controlling operation of a vehicle access door relative to an obstacle, illustrating the access door as a liftgate in a closed state, according to the disclosure.

A respective access door 32 is provided to selectively cover and uncover at least a portion of the access opening 30 into the cargo enclosure 34. The cargo enclosure 34 may be configured as a separate compartment, such as a fully enclosed trunk, for instance in a traditional three-box sedan body style, while the respective access door 32 may be configured as a hinged deck-lid, as shown in FIG. 2. The access door 32 may also be configured as a tailgate, shown in FIG. 3, for a fully or partially enclosed trunk, wherein at least one side of the trunk is open to the passenger compartment 28-1. As shown, the tailgate-type of the access door 32 is hinged at the rear end 18 of the vehicle body 14 to swing out relative to the vehicle body 14. The tailgate access door 32 may swing in a substantially vertical (Z direction), but also outwardly in a pivotable movement relative to the vehicle body 14, such as a liftgate. Additionally, the access door 32 may be configured as a tailgate hinged at the rear end 18 of the vehicle body 14 for substantially horizontal (in X-Y plane) pivotable movement, such as a swing-out door (not shown).

Although the cargo enclosure 34 is primarily described and shown throughout the Figures as being arranged at the rear end 18 of the vehicle body 14, such a cargo enclosure may also be arranged proximate the front end 16. Such a front-positioned cargo enclosure 34 (not shown) may, for example, be used in a rear-engine or a mid-engine vehicle. The disclosed tailgate is of the type that is frequently used for access to the interiors and storage compartments in vans, station wagons, and sport utility vehicles (SUVs). As envisioned herein, each access door 32 includes a mechanism 32A (shown in FIG. 3), which may incorporate a drive unit or actuator for opening and closing the respective access door and a latch configured to selectively fasten the door to the vehicle body 14 and release the door therefrom.

Figure 3:
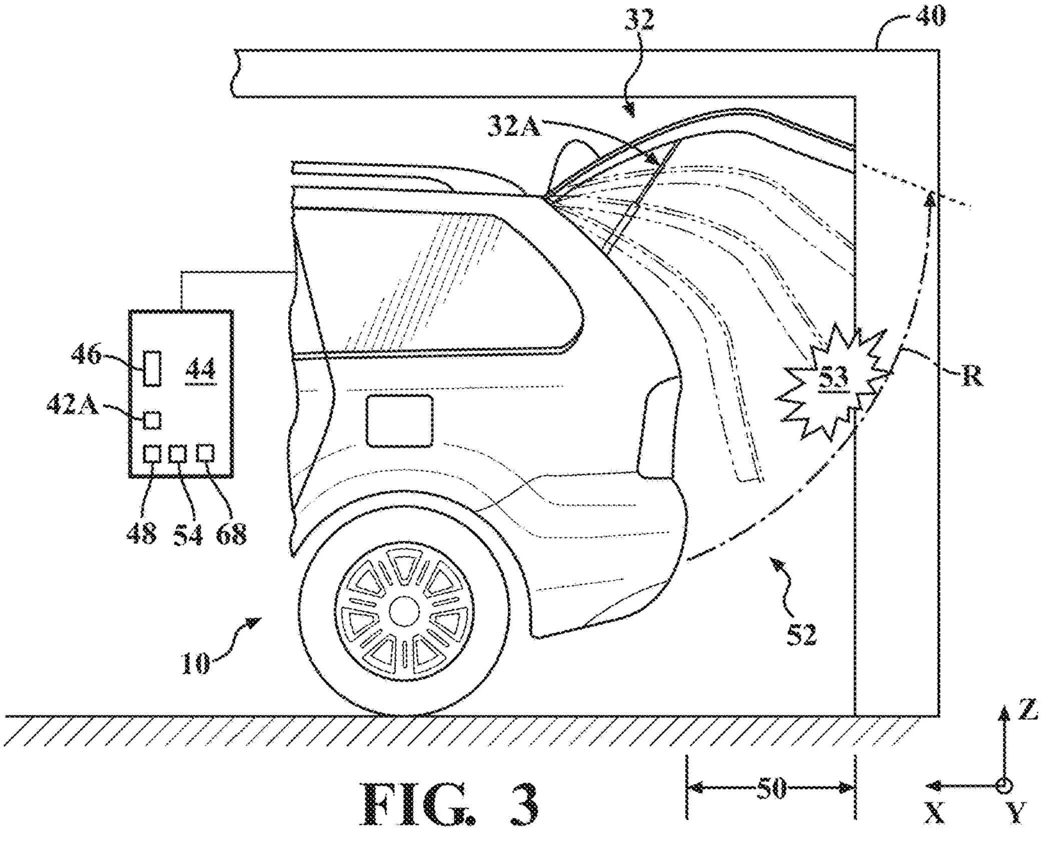
FIG. 3 is a partial side view of the vehicle shown in FIG. 2, illustrating the liftgate's range of operation relative to the obstacle, according to the disclosure.

As shown in FIGS. 1-3, vehicle 10 also includes a system 36 for operating an access door 32, such as the doors described above, of the subject vehicle 10. The system 36 includes a camera 38 mounted externally on the vehicle body 14 (to vehicle exterior 26) proximate or on the access door 32. In the embodiment of the liftgate, the camera 38 may be the device generally used for vehicle parking, while for side doors, the camera 38 may be one of the devices used to stitch together a vehicle exterior view. The camera 38 is configured to detect an obstacle 40 within range R of operation of the access door 32, e.g., the door's swing path or trajectory, and generate a predefined image 42 on the obstacle relative to the subject access door. The predefined image 42 may, for example, have a particular shape or define a specific aspect of the access door, such as a portion nearest to the obstacle. The obstacle 40 may, for example, be a parking structure wall, a nearby vehicle, a parking garage ceiling, etc.

The vehicle 10 also includes an energy storage device 43, such as one or more rechargeable batteries. The system 36 further includes an electronic controller 44 mounted on the vehicle 10 and in operative communication with the camera 38. The electronic controller 44 may be a central processing unit (CPU) or a body control module (BCM) configured to receive data signals from various vehicle sensors and regulate operation of vehicle systems, including the system 36. The electronic controller 44 may be in operative communication with such vehicle systems and sensors via a data network, e.g., a Controller Area Network (CAN bus), arranged in the vehicle 10. The energy storage device 43 is used for generating electrical power to operate the camera 36, electronic controller 44, as well as various other vehicle systems, such as a powertrain, lighting, infotainment, and heating, ventilation, and air conditioning (HVAC).

The electronic controller 44 includes a memory that is tangible and non-transitory. The memory may be a recordable medium that participates in providing computer-readable data or process instructions. Such a medium may take many forms, including but not limited to non-volatile media and volatile media. Non-volatile media used by the electronic controller 44 may include, for example, optical or magnetic disks and other persistent memory. Volatile media of each of the controller's memory may include, for example, dynamic random-access memory (DRAM), which may constitute a main memory. Such instructions may be transmitted by one or more transmission medium, including coaxial cables, copper wire and fiber optics, including the wires that comprise a system bus coupled to the vehicle systems.

Memory of the electronic controller 44 may also include a flexible disk, hard disk, magnetic tape, other magnetic medium, a CD-ROM, DVD, other optical medium, etc. The electronic controller 44 may be equipped with a high-speed primary clock, requisite Analog-to-Digital (A/D) and/or Digital-to-Analog (D/A) circuitry, input/output circuitry and devices (I/O), as well as appropriate signal conditioning and/or buffer circuitry. Algorithms required by the electronic controller 44 or accessible thereby, generally indicated via numeral 46, may be programmed in the controller, stored in the memory, and automatically executed to provide the required functionality, such as for operating the system 36.

The electronic controller 44 is configured, i.e., structured and programmed, to provide automatic control of the vehicle's particular access door 32 using the vehicle's camera 38. As shown in FIG. 2, the electronic controller 44 is configured to receive a command 48, such as a signal from the vehicle's user via a switch positioned on the vehicle (in the interior 28 or on the door 32) or via a remote transmitter (not shown) or a mobile phone application, to open the access door 32. The electronic controller 44 is also configured to process a pixelated resolution 42A (shown in FIGS. 2 and 3) of image 42 of the obstacle 40 positioned relative to the access door 32 The electronic controller 44 is additionally configured to determine a distance 50 of the obstacle 40 from the access door 32 and relative to the access door's range R of operation using the pixelated resolution 42A of the generated image 42.

The determination of distance 50 may be accomplished by analyzing a number of pixels per specific feature or defining the entire shape of the generated image 42. In other words, the electronic controller 44 may be programmed to determine the number of pixels in the generated image 42 and correlate the pixel number to distance of the obstacle 40 from the corresponding access door 32. For example, if the image 42, or a specific feature thereof, generated on the obstacle 50 requires a certain number of pixels, the electronic controller 44 may construe the obstacle 40 as being positioned within a particular distance 50 of the vehicle 10. As shown in FIG. 1, the generated image 42, including the obstacle 50, may be displayed in the passenger compartment 28-1 for viewing and proximity assessment by a vehicle's user or operator.

As shown in FIGS. 2 and 3, the electronic controller 44 is also configured to limit the access door's range R of operation when the distance 50 of the obstacle 40 from the access door 32 and relative to the access door's range of operation is within a predetermined zone 52 to avoid physical contact 53 (shown in FIG. 3) between the access door and the obstacle. The electronic controller 44 may block the opening of the access door 32 entirely when the distance 50 is within the predetermined zone 52. Alternatively, the electronic controller 44 may authorize the full opening of the access door 32 when the distance 50 is outside the predetermined zone 52. The predetermined zone 52 is an area proximate the vehicle exterior 26 where full operation of the door 32 would put the subject door in danger of physical contact 53 with the obstacle 40. The vehicle controller 44 may be further configured to release the access door 32 via the mechanism 32A in response to the command 48 when the opening of the access door 32 has been authorized.

As shown in FIGS. 2 and 3, the electronic controller 44 may be additionally configured to generate a sensory signal or alert 54 when the distance 50 of the obstacle 40 from the access door 32 and relative to the access door's range R of operation is within the predetermined zone 52. The alert 54 may be an audible alarm and/or a visual signal displayed on the vehicle's instrument panel or on the user's communication device, such as a mobile telephone. As shown in FIG. 1, the system 36 may further include a light source 56 mounted to vehicle exterior 26 (to the vehicle body 14) adjacent to the camera 38. The light source 56 is configured to project a light beam 56A onto the obstacle 40 when the camera generates the image 42 on the obstacle, such that the image generated on the obstacle is within the projected light. In other words, once the light beam 56A is projected onto the obstacle 40, the light and the image 42 within it become visible to the camera 38. The light beam 56A is particularly beneficial in illuminating the detected obstacle 40 and generating a clear image 42 in reduced visibility conditions, such as during nighttime and in inclement weather.

The algorithm 46 programmed into the electronic controller 44 may be a machine learning algorithm. The subject machine learning algorithm may be specifically configured to determine the distance 50 of the obstacle 40 from the access door 32 and relative to the access door's range R of operation based on the pixelated resolution 42A of the generated image 42. The machine learning algorithm 46 may be used for object recognition in low light conditions to stop movement of the access door 32 prior to its contact with the obstacle 40. A particular machine learning algorithm 46 may be structured to recognize pixel shapes and sizes to correlate such data to specific distances 50 of the obstacle 40 from the vehicle 10. The electronic controller 44 may be additionally in communication with a global positioning system (GPS) 58 and configured to determine or establish a global position 60 of the detected obstacle 40 using the GPS (shown in FIG. 1).

As shown in FIG. 1, the electronic controller 44 may further communicate (share) the determined global position 60 of the obstacle 40 to an information technology (IT) cloud server 62 arranged remotely from the vehicle 10 and in wireless communication with the electronic controller. Such an IT cloud server 62 may be configured to retain or store the communicated determined global position 60 of the detected obstacle 40 on the IT cloud server to generate an obstacle database 64. The IT cloud server 62 may be in wireless communication with remote detection sources, such as the GPS, and with multiple electronic controllers on respective vehicles and configured to receive vehicle location data from such vehicle controllers. The IT cloud server 62 may be further configured to communicate or share from the obstacle database 64 the determined global position 60 of the detected obstacle 40 with another vehicle's electronic controller (not shown).

The controller 44 may use the GPS 58 and the camera(s) 38 to monitor an area 66 surrounding the vehicle 10 for changed obstruction conditions, e.g., another parked vehicle arriving into and being parked within the predetermined zone 52. The system 36 may also utilize the vehicle-to-vehicle communication to request a nearby vehicle to move out of the zone 52 and expand clearance for the access door 32. The electronic controller 44 may be further configured to operate the vehicle 10 in an autonomous mode 68, i.e., where the vehicle is controlled using vehicle sensors and without human involvement, to shift the vehicle outside the predetermined zone 52 and thereby achieve operating clearance for the access door 32 relative to the detected obstacle 40. Such a feature may be activated by the vehicle's user remotely, such as via a mobile telephone, or via input to a vehicle's infotainment system before exiting the vehicle.

The system 36 may also permit the vehicle user to focus the camera 38 and the light source 56 on a particular feature of the obstacle to gage the distance thereto while manually controlling the opening (and closing) of the access door 32.

Figure 4:
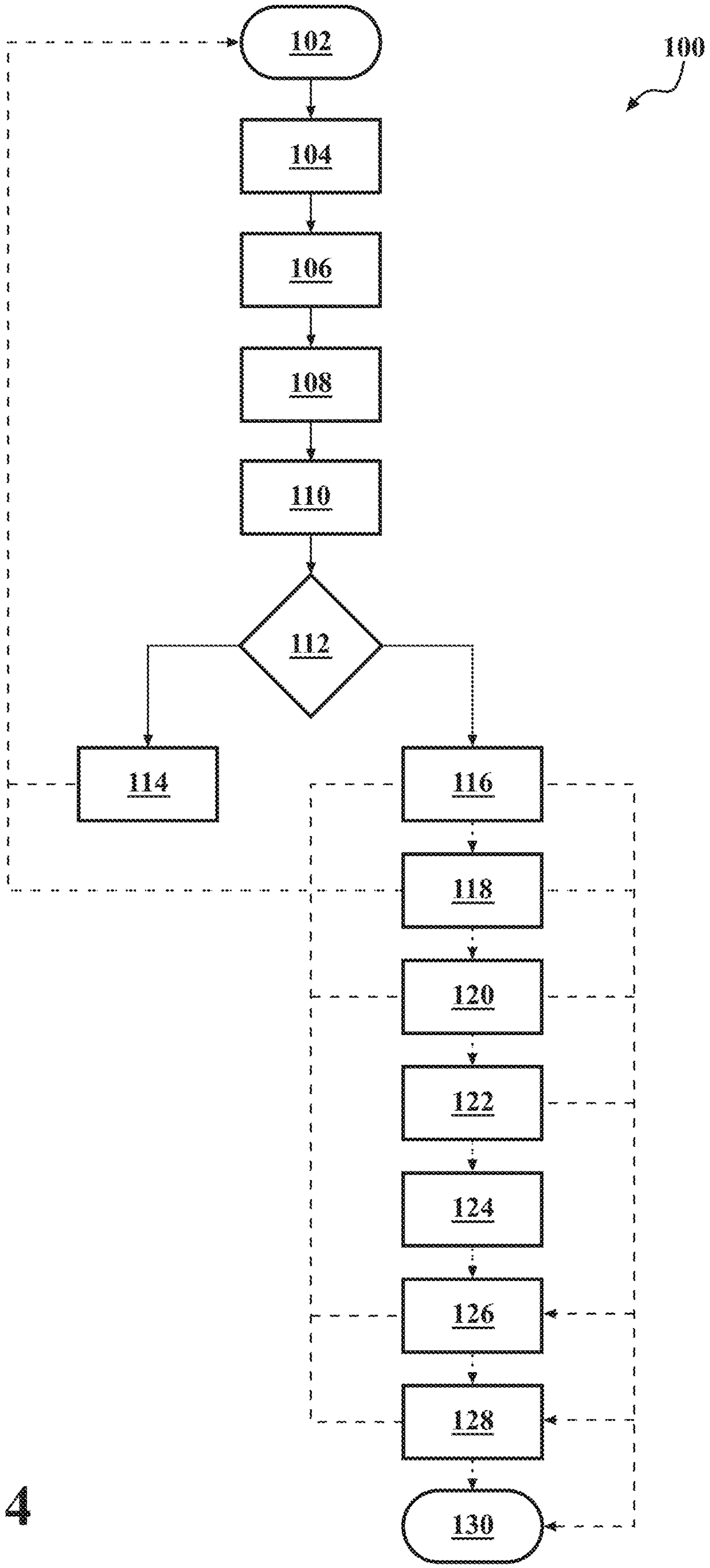
FIG. 4 illustrates, in flow chart format, a method of operating an access door in a vehicle shown in FIGS. 1-3, according to the disclosure.

FIG. 4 depicts a method 100 of operating a vehicle access door 32, via the system 36 described above with respect to FIGS. 1-3. Overall, the method 100 is intended to provide automatic detection of an obstacle in the path of the vehicle's access door, assessment of the clearance between the obstacle and the door's opening trajectory, and thereby enable smart control of the subject access door to avoid physical contact between the access door and the obstacle. As specifically noted above, the access door 32 may be a swing-out liftgate arranged at the rear end 18 of the vehicle 10. The method commences in frame 102 with receiving, via the electronic controller 44, a user or vehicle system command 48 to open a particular access door 32. Following frame 102, the method advances to frame 104. In frame 104 the method includes detecting obstacle 40 within the range R of operation of the access door 32. As described above with respect to FIGS. 1-3, detecting the obstacle 40 may be accomplished via the camera 38. After frame 104, the method moves on to frame 106.

According to the disclosure, in frame 106, the method includes generating, via the camera 38, the predefined image 42 on the obstacle 40 relative to the subject access door 32. As described with respect to FIGS. 1-3, generating the image 42 of the obstacle 40 relative to the access door 32 may include projecting a beam of light 56A onto the obstacle via the light source 56, such that the image generated on the obstacle is within the projected light. After frame 106, the method proceeds to frame 108. In frame 108, the method includes processing, via the electronic controller 44, the pixelated resolution 42A of the generated image 42. Following frame 108, the method advances to frame 110. In frame 110, the method includes determining, via the electronic controller 44, the distance 50 of the obstacle 40 from the access door 32 and relative to the access door's range R of operation using the pixelated resolution 42A of the generated image. Determining the distance 50 of the obstacle 40 from the access door 32 and relative to the access door's range R of operation may be accomplished via the machine learning algorithm (46) programmed into the electronic controller 44. After determining the distance 50, the method advances to frame 112.

In frame 112, the method includes determining whether the distance 50 is sufficient to open the access door 32 without jeopardizing the door's contact with the obstacle 40. When the distance 50 of the obstacle 40 from the access door 32 and relative to the access door's range R of operation is outside the predetermined zone 52, in frame 114 the method includes authorizing the access door's full range R of operation via the electronic controller 44. After frame 114, the method may return to frame 102. On the other hand, when the distance 50 of the obstacle 40 from the access door 32 and relative to the access door's range R of operation is outside the predetermined zone 52, in frame 116 the method includes limiting the access door's range R of operation and possibly blocking, via the electronic controller 44, the access door from opening to avoid physical contact between the access door and the obstacle. After frame 116, the method may proceed to frame 118.

In frame 118, the method includes generating, via the electronic controller 44, the alert 54 when the distance 50 of the obstacle 40 from the access door 32 and relative to the access door's range R of operation is within the predetermined zone 52. After frame 118, the method may proceed to frame 120. In frame 120, the method includes determining the global position 60 of the detected obstacle 40 and communicating, via the electronic controller 44, the determined global position of the obstacle to the IT cloud server 62. Following frame 120, the method may advance to frame 122 for retaining the determined global position 60 of the detected obstacle 40 on the IT cloud server 62 to generate the obstacle database 64. After frame 122, the method may proceed to frame 124. In frame 124, the method includes communicating from the obstacle database 64, via the IT cloud server 62, the determined global position 60 of the detected obstacle 40 with another electronic controller, e.g., positioned on another vehicle.

Following each of the frames 116-124, the method 100 may proceed to one of frames 126 and 128. In frame 126, the method may include monitoring, via the camera 38, the area 66 surrounding the vehicle 10 for changed obstruction conditions, such as another vehicle parked within the predetermined zone 52. In frame 128, the method may include operating the vehicle 10, via the electronic controller 44, in the autonomous mode 68 to shift the vehicle outside the predetermined zone 52 and thereby achieve operating clearance for the access door 32 relative to the detected obstacle 40, as described above relative to FIGS. 1-3. Following each of the frames 116, 118, 120, 126, and 128, the method may return to frame 102 or conclude in frame 130.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of operating an access door in a vehicle, the method comprising:

receiving, via an electronic controller, a command to open the access door;

detecting an obstacle within range of operation of the access door;

generating, via a camera, a predefined image on the obstacle relative to the access door;

processing, via the electronic controller, a pixelated resolution of the generated image;

determining, via the electronic controller, a distance of the obstacle from the access door and relative to the access door's range of operation using the pixelated resolution of the generated image;

limiting, via the electronic controller, the access door's range of operation when the distance of the obstacle from the access door and relative to the access door's range of operation is within a predetermined zone to avoid physical contact between the access door and the obstacle; and operating the vehicle, via the electronic controller, in autonomous mode to shift the vehicle outside the predetermined zone and thereby achieve operating clearance for the access door relative to the detected obstacle.

2. The method according to claim 1, wherein the vehicle has a vehicle body defined by bodysides, a front end, and a rear end, and wherein the access door is a liftgate arranged at the rear end of the vehicle.

3. The method according to claim 1, wherein detecting the obstacle is accomplished via the camera.

4. The method according to claim 1, wherein generating the predefined image on the obstacle includes projecting a light onto the obstacle via a light source mounted to the vehicle adjacent to the camera, such that the image generated on the obstacle is within the projected light.

5. The method according to claim 1, wherein determining the distance of the obstacle from the access door and relative to the access door's range of operation is accomplished via a machine learning algorithm programmed into the electronic controller.

6. The method according to claim 1, further comprising retaining the communicated determined global position of the detected obstacle on the IT cloud server to generate an obstacle database.

7. The method according to claim 6, further comprising communicating from the obstacle database, via the IT cloud server, the determined global position of the detected obstacle with another electronic controller.

8. The method according to claim 7, wherein the another electronic controller is positioned on another vehicle.

9. The method according to claim 1, further comprising monitoring, via the camera, an area surrounding the vehicle for changed obstruction conditions.

10. The method according to claim 1, further comprising determining a global position of the detected obstacle and communicating, via the electronic controller, the determined global position of the obstacle to an information technology (IT) cloud server arranged remotely from the vehicle and in wireless communication with the electronic controller.

11. A system for operating an access door in a vehicle, the system comprising:

a camera mounted on the vehicle proximate the access door and configured to: detect an obstacle within range of operation of the access door and generate a predefined image on the obstacle relative to the access door; and an electronic controller mounted on the vehicle and in operative communication with the camera and configured to:

receive a command to open the access door;

process a pixelated resolution of the generated image of the obstacle relative to the access door;

determine a distance of the obstacle from the access door and relative to the access door's range of operation using the pixelated resolution of the generated image;

limit the access door's range of operation when the distance of the obstacle from the access door and relative to the access door's range of operation is within a predetermined zone to avoid physical contact between the access door and the obstacle; and operate the vehicle in autonomous mode to shift the vehicle outside the predetermined zone and thereby achieve operating clearance for the access door relative to the detected obstacle.

12. The system according to claim 11, wherein the vehicle has a vehicle body defined by bodysides, a front end, and a rear end, and wherein the access door is a liftgate arranged at the rear end of the vehicle.

13. The system according to claim 11, further comprising a light source mounted to the vehicle adjacent to the camera and configured to project a light onto the obstacle when the camera generates the predefined image on the obstacle, such that the image generated on the obstacle is within the projected light.

14. The system according to claim 11, wherein the electronic controller is programmed with a machine learning algorithm configured to determine the distance of the obstacle from the access door and relative to the access door's range of operation.

15. The system according to claim 11, wherein the IT cloud server is configured to retain (store) the communicated determined global position of the detected obstacle on the IT cloud server to generate an obstacle database.

16. The system according to claim 15, wherein the IT cloud server is additionally configured to communicate from the obstacle database the determined global position of the detected obstacle with another electronic controller.

17. The method according to claim 16, wherein the another electronic controller is positioned on another vehicle.

18. The system according to claim 11, wherein the camera is additionally configured to monitor an area surrounding the vehicle for changed obstruction conditions.

19. The system according to claim 11, wherein the electronic controller is additionally configured to determine a global position of the detected obstacle and communicate the determined global position of the obstacle to an information technology (IT) cloud server arranged remotely from the vehicle and in wireless communication with the electronic controller.

20. A method of operating a liftgate arranged at a rear end of a vehicle body, the method comprising:

receiving, via an electronic controller, a command to open the liftgate;

detecting, via a camera, an obstacle within range of operation of the liftgate;

projecting, via a light source, a light onto the obstacle;

generating, via a camera, a predefined image on the obstacle, within the projected light, relative to the liftgate;

processing, via the electronic controller, a pixelated resolution of the generated image;

determining, via the electronic controller, a distance of the obstacle from the liftgate and relative to the liftgate's range of operation using the pixelated resolution of the generated image;

limiting, via the electronic controller, the liftgate's range of operation when the distance of the obstacle from the liftgate and relative to the liftgate's range of operation is within a predetermined zone to avoid physical contact between the liftgate and the obstacle;

generating, via the electronic controller, a sensory signal or alert when the distance of the obstacle from the liftgate and relative to the liftgate's range of operation is within the predetermined zone; and operating the vehicle, via the electronic controller, in autonomous mode to shift the vehicle outside the predetermined zone and thereby achieve operating clearance for the access door relative to the detected obstacle.

* * * * *